United States Patent
Buick et al.

(10) Patent No.: US 11,924,102 B2
(45) Date of Patent: Mar. 5, 2024

(54) MINIMIZING DEVIATION FROM AVERAGE LATENCY OF TABLE LOOKUPS

(71) Applicant: NXP B.V., Eindhoven (NL)

(72) Inventors: Timothy John Buick, Kanata (CA); John Pillar, Kanata (CA); James Lancelot Hardman, Kanata (CA); Matthew Erwin Sippert, Kanata (CA)

(73) Assignee: NXP B.V., Eindhoven (NL)

(*) Notice: Subject to any disclaimer, the term of this patent is extended or adjusted under 35 U.S.C. 154(b) by 154 days.

(21) Appl. No.: 17/658,029

(22) Filed: Apr. 5, 2022

(65) Prior Publication Data

US 2023/0318975 A1 Oct. 5, 2023

(51) Int. Cl.
*G06F 7/02* (2006.01)
*G06F 16/00* (2019.01)
*G06F 16/13* (2019.01)
*H04L 45/02* (2022.01)
*H04L 45/12* (2022.01)
*H04L 45/42* (2022.01)
*H04L 45/7453* (2022.01)
*G06F 16/22* (2019.01)
*G06F 16/901* (2019.01)

(52) U.S. Cl.
CPC ........ *H04L 45/7453* (2013.01); *G06F 16/137* (2019.01); *H04L 45/02* (2013.01); *H04L 45/12* (2013.01); *H04L 45/42* (2013.01); *G06F 16/2255* (2019.01); *G06F 16/9014* (2019.01)

(58) Field of Classification Search
CPC ..... H04L 45/7453; H04L 45/02; H04L 45/12; H04L 45/42; G06F 16/137; G06F 16/2255; G06F 16/9014
See application file for complete search history.

(56) References Cited

U.S. PATENT DOCUMENTS

| | | |
|---|---|---|
| 7,852,850 B2 | 12/2010 | Kopelman et al. |
| 7,984,028 B2 | 7/2011 | Laursen et al. |
| 8,397,025 B2 | 3/2013 | Punde et al. |
| 9,871,728 B2 | 1/2018 | Arad et al. |
| 2014/0301394 A1 | 10/2014 | Arad et al. |

(Continued)

OTHER PUBLICATIONS

Herlihy, M., "Hopscotch Hashing", Distributed Computing; [Lecture Notes in Computer Science], Springer Berlin Heidelberg, pp. 350-364, XP019107092, ISBN: 978-3-540-87778-3, Sep. 22, 2008.

(Continued)

*Primary Examiner* — Bruce M Moser

(57) ABSTRACT

A computer-implemented method, network switch and computer program product for performing exact match lookup operations in a table. A hash of the lookup key is performed to generate a value which is used to identify a location in the hash memory space. The generated value is separated into a bucket row, a bucket column, a bucket plane and a secondary hash value, where the bucket row, bucket column and bucket plane are used to identify an originating home hash root bucket. The head entry on the collision chain of a hash root bucket identified via the secondary hash value that is a neighbor to the home hash root bucket is read to determine if an exact match of the lookup key exists. If the head entry exactly matches the lookup key, then a finding of an exact match of the lookup key is reported.

20 Claims, 10 Drawing Sheets

(56) References Cited

U.S. PATENT DOCUMENTS

| | | | |
|---|---|---|---|
| 2020/0228449 A1* | 7/2020 | Shmilovici Leib | H04L 45/00 |
| 2022/0147502 A1* | 5/2022 | Chu | G06F 13/4221 |
| 2023/0246950 A1* | 8/2023 | Kaimal | H04L 63/062 |
| | | | 709/223 |

OTHER PUBLICATIONS

Liu, X., "Consistent RDMA-Friendly Hashing on Remote Persistent Memory", arxiv.org, Cornell University Library, Jul. 14, 2021.

* cited by examiner

MINIMIZING DEVIATION FROM AVERAGE LATENCY OF TABLE LOOKUPS

TECHNICAL FIELD

The present disclosure relates generally to operations regarding table lookups, such as hash table lookups.

BACKGROUND

Networking equipment, such as network switches, are used to connect devices on a computer network. Some networking equipment utilize using packet switching to receive and forward data to the destination device. One type of network switch is a multiport network bridge that uses media access control (MAC) addresses to forward data at the data link layer (layer 2) of the open systems interconnection (OSI) model. Some switches can also forward data at the network layer (layer 3) by additionally incorporating routing functionality. Such switches are commonly known as layer-3 switches or multilayer switches.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
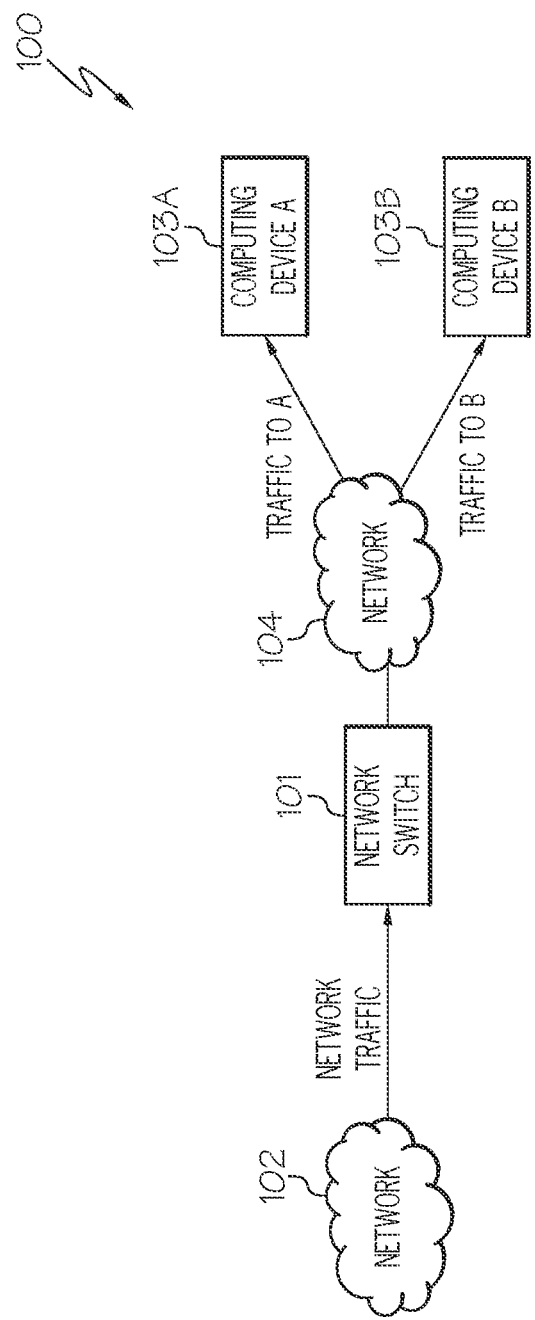
FIG. 1 illustrates a communication system for practicing the principles of the present disclosure in accordance with an embodiment of the present disclosure.

Some types of network switches manage the flow of data across a network by transmitting a received network packet only to the one or more devices for which the packet is intended. Each networked device connected to a switch can be identified by its network address, allowing the switch to direct the flow of traffic maximizing the security and efficiency of the network.

In connection with transmitting the received network packet to the one or more devices for which the packet is intended, the network switch processes the received network packet. Such processing may involve multiple table lookups, such as multiple hash table lookups.

A hash table is a data structure that implements an associative array abstract data type, a structure that can map "keys" to values. Such "keys" may be formed from network identifiers. A hash table uses a hash function to compute an index, also called a hash code, into an array of buckets or slots, from which the desired value can be found. During lookup, the key is hashed and the resulting hash indicates where the corresponding value is stored.

Ideally, the hash function will assign each key to a unique bucket, but most hash table designs employ an imperfect hash function, which might cause hash collisions where the hash function generates the same index for more than one key. Such collisions are typically accommodated in some way.

In a well-dimensioned hash table, the average cost (number of instructions) for each lookup is independent of the number of elements stored in the table.

In many situations, hash tables turn out to be on average more efficient than search trees or any other table lookup structure. That is, the average latency of a lookup (how long it takes to locate the desired value based on the key) in a hash table is less than the average latency of a lookup in other table lookup structures.

For this reason, they are widely used in many kinds of computer software, particularly for associative arrays, database indexing, caches, and sets. As a result, they are commonly used by network switches in connection with packet processing to direct the flow of traffic.

Maintaining a low average lookup latency is important in order for networking equipment, such as network switches, to maintain line rate performance. Line rate performance refers to the ability of the networking equipment to process the maximum amount of data payload at the link speeds its interface uses.

However, networking equipment, such as network switches, may perform exact match lookups based on the keys formed from the network identifiers. An "exact match lookup," as used herein, refers to searching for the exact match to the search key in the hash table. When searching for the exact match to the search key, hash collisions occur as discussed above. When a hash collision occurs, the hash table is probed to find the exact match to the search key which involves latency or time. Such deviations from the average lookup latency may negatively affect the line rate performance.

Unfortunately, algorithms to address collisions focus on minimizing the average lookup latency as opposed to minimizing the deviation from the average lookup latency, which impacts the line rate performance. As a result, there is not currently a means for effectively minimizing the deviation from the average lookup latency to ensure appropriate line rate performance.

The embodiments of the present disclosure provide a means for effectively minimizing the deviation from the average lookup latency to ensure appropriate line rate performance by utilizing a concept referred to herein as "billeting," which as used herein, refers to a neighboring hash root bucket temporarily hosting or storing an element (data) of an originating home hash root bucket as discussed further below.

In some embodiments of the present disclosure, the present disclosure comprises a computer-implemented method, network switch and computer program product for performing exact match lookup operations in a table. In one embodiment of the present disclosure, fields of a received packet are extracted and concatenated to form a lookup key. A hash of the lookup key is performed to generate a value ("hash value") which is used to identify a location in the hash memory space organized into M independently addressable planes, where each row of the plane contains N hash root buckets. A "plane" or "bank," as used herein, refers to a logical storage within computer memory that is used for storing and retrieving data. "Hash root buckets" (also referred to as "hash buckets" or simply "buckets"), as used herein, refer to the slots in the hash table. A "hash table," as used herein, refers to a data structure that implements an associative array abstract data type, a structure that can map "keys" to values. The generated hash value may then be separated into a bucket row, a bucket column, a bucket plane and a sub-bucket (secondary hash value), where the bucket row, bucket column and bucket plane are used to identify an originating home hash root bucket. In one embodiment, the head entry on the collision chain of the neighboring hash root bucket is read to determine if an exact match of the lookup key exists in response to a state field of the neighboring hash root bucket storing the secondary hash value, a column offset to a column location of the originating home hash root bucket and a plane offset to a plane location of the originating home hash root bucket. If the head entry on the collision chain of the neighboring hash root bucket exactly matches the lookup key, then a finding of an exact match of the lookup key is reported. If, however, the state field of the neighboring hash root buckets do not store the secondary hash value, the column offset to the column location of the originating home hash root bucket and the plane offset to the plane location of the originating home hash root bucket or if the head entry on the collision chain of the neighboring hash root bucket does not exactly match the lookup key, then a chain length in the chain length field and a value of the state field of the originating home hash root bucket are examined. If the value of the chain length is zero or if the value of the chain length is one and the value in the state field of the originating home hash root bucket is nonzero, then a finding of not having an exact match of the lookup key is reported. Otherwise, the root pointer entry of the originating home hash root bucket is read. If the root pointer entry exactly matches the lookup key and does not temporarily store an element of another originating home hash root bucket, then a finding of an exact match of the lookup key is reported. Otherwise, the next entry to the root pointer entry in the collision chain is read to determine if such an entry exactly matches the lookup key. If such an entry exactly matches the lookup key, then a finding of an exact match of the lookup key is reported. Otherwise, the subsequent entry in the chain is read to determine if such an entry matches the lookup key. Such a process continues until either a finding of an exact match occurs or until the last entry in the collision chain is read. If the last entry in the collision chain does not exactly match the lookup key, then a finding of not having an exact match of the lookup key is reported. In this manner, the deviation from the average lookup latency is minimized to ensure appropriate line rate performance.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes networking equipment, such as a network switch 101, configured to receive data packets over a network 102, which is forwarded to the appropriate computing device 103A-103B (identified as "Computing Device A," and "Computing Device B," respectively, in FIG. 1) over a network 104, such as shown in FIG. 1. Computing devices 103A-103B may collectively or individually be referred to as computing devices 103 or computing device 103, respectively.

Data packets (also referred to herein as simply "packets") refer to the data grouped by the method of packet switching that are transmitted over a digital network. Packets are comprised of a header and a payload. Data in the header is used by the networking equipment, such as network switch 101, to direct the packet to its destination, where the payload is extracted and used by an operating system, application software or higher layer protocols of a computing device, such as computing device 103.

As previously discussed, network traffic, such as data packets received over network 102, is forwarded to and from computing devices, such as computing devices 103, by network switch 101 over network 104. In one embodiment, network switch 101 connects devices 103 on a computer network by using packet switching to receive and forward data to the destination device. In one embodiment, network switch 101 is a multiport network bridge that uses MAC addresses to forward data at the data link layer (layer 2) of the open systems interconnection (OSI) model. In one embodiment, network switch 101 also forwards data at the network layer (layer 3) by additionally incorporating routing functionality.

Furthermore, network switch 101 manages the flow of data across a network by transmitting a received network packet only to the one or more devices (e.g., computing device 103B) for which the packet is intended. Each networked device 103 connected to a network switch (e.g., network switch 101) can be identified by its network address, allowing the switch to direct the flow of traffic thereby maximizing the security and efficiency of the network.

In connection with transmitting the received network packet to the one or more devices for which the packet is intended, network switch 101 processes the received network packet. Such processing involves multiple table lookups, such as multiple hash table lookups.

In one embodiment, network switch 101 minimizes the deviation from the average lookup latency of the hash table by utilizing a concept referred to herein as "billeting," which as used herein, refers to a neighboring hash root bucket temporarily hosting or storing an element (data) of an originating home hash root bucket. A further description of these and other features is provided below.

A description of the components of network switch 101 is provided below in connection with FIG. 2. A description of the software components used by network switch 101 for minimizing the deviation from the average lookup latency of the hash table is provided further below in connection with FIG. 3.

Referring again to FIG. 1, computing devices 103 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance, server, and the like) configured with the capability of connecting to network 104 and consequently communicating with other computing devices 103 and network switch 101.

Networks 102, 104 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 is not to be limited in scope to any one particular network architecture. System 100 may include any number of network switches 101, networks 102, 104, and computing devices 103. Furthermore, while FIG. 1 illustrates two separate networks, such as networks 102, 104, system 100 may include a single network interconnecting the components shown in FIG. 1.

A discussion regarding the components of network switch 101 is provided below in connection with FIG. 2.

Figure 2:
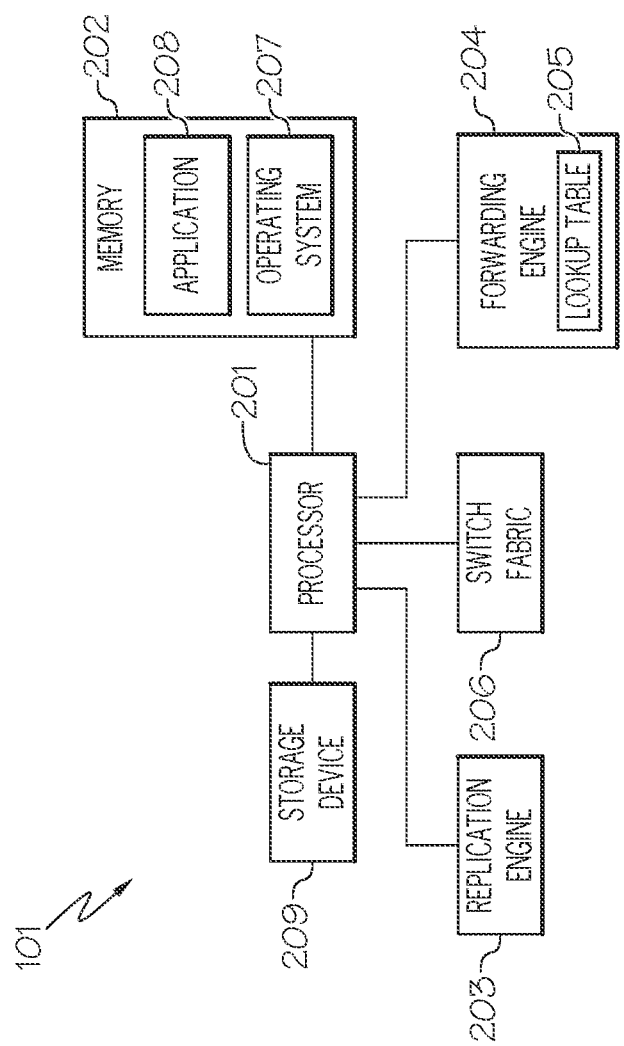
FIG. 2 illustrates an embodiment of the present disclosure of the components of the network switch which is representative of a hardware environment for practicing the present disclosure.

FIG. 2 illustrates an embodiment of the present disclosure of the components of network switch 101 which is representative of a hardware environment for practicing the present disclosure.

Referring to FIG. 2, network switch 101 includes a processor 201 connected to memory 202. In one embodiment, processor 201 is a network traffic processor configured to process data packets by transmitting a received network packet only to the one or more devices (e.g., computing device 103B of FIG. 1) for which the packet is intended. Furthermore, in one embodiment, network traffic processor 201 is configured to minimize the deviation from the average lookup latency of the hash table using the principles of the present disclosure as discussed herein. Network traffic processor 201 may be implemented in hardware, software or in a combination thereof.

Network switch 101 may further include a replication engine 203 connected to processor 201. In one embodiment, replication engine 203 is tasked with duplicating packets of data and sending them to their designated destinations. For example, a single data packet may be sent to multiple destinations in a network. For instance, a user may desire to send documents or business reports to multiple people within the user's organization.

Network switch 101 may additionally include a forwarding engine 204 connected to processor 201. In one embodiment, forwarding engine 204 is configured to perform the switching and routing decisions. In one embodiment, forwarding engine 204 contains lookup tables 205, such as a hash lookup table(s) discussed herein, which is used by forwarding engine 204 to send data packets to their appropriate destination. Each packet of data contains information, such as the destination and source addresses of the packet. Forwarding engine 204 reads the destination address on the data packet and then sends it there accordingly.

Additionally, network switch 101 includes a switch fabric 206 connected to processor 201. In one embodiment, switch fabric 206 is comprised of hardware and software that work in tandem to ensure that data coming into the network is sent out via the appropriate port (not shown). In one embodiment, the hardware and software include the switching units contained in a network node and the software required to control the switching paths.

In one embodiment, memory 202 stores the code for operating system 207 and application 208. In one embodiment, processor 201 executes the code for operating system 207 which provides control and coordination of the functions of the various components of FIG. 2. Furthermore, in one embodiment, processor 201 executes the code for application 208. An application 208 in accordance with the principles of the present disclosure runs in conjunction with operating system 207 and provides calls to operating system 207 where the calls implement the various functions or services to be performed by application 208. Application 208 may include the software components used by network switch 101, including forwarding engine 204, to minimize the deviation from the average lookup latency of the hash table using the principles of the present disclosure as discussed below in connection with FIG. 3.

Memory 202 may include, but not limited to, random access memory (RAM), read-only memory (ROM), erasable programmable read-only memory (EPROM or Flash memory), static random access memory (SRAM), combinations thereof, etc.

Furthermore, network switch 101 may include a storage device 209 connected to processor 201. Examples of storage device 209 include, but not limited to, a hard disk, a portable compact disc read-only memory (CD-ROM), a digital versatile disk (DVD), a memory stick, etc.

Figure 3:
FIG. 3 illustrates the software components used by the network switch for minimizing the deviation from the average lookup latency of the hash table in accordance with an embodiment of the present disclosure.

Referring now to FIG. 3, FIG. 3 illustrates the software components used by network switch 101 for minimizing the deviation from the average lookup latency of the hash table in accordance with an embodiment of the present disclosure.

In one embodiment, network switch 101 includes a lookup table creator engine 301 configured to create and populate a hash table in a manner that minimizes the deviation from the average lookup latency of the hash table by utilizing a concept referred to herein as "billeting," which as used herein, refers to a neighboring hash root bucket temporarily hosting or storing an element (data) of an originating home hash root bucket.

Network switch 101 further includes a packet analyzer 302 configured to perform exact match lookup operations in such a hash table in a manner that minimizes the deviation from the average lookup latency of the hash table.

Referring now to FIG. 2, in conjunction with FIG. 3, in one embodiment, application 208 of network switch 101 includes the software components of lookup table creator engine 301 and packet analyzer 302. In one embodiment, such components may be implemented in hardware, where such hardware components would be connected to processor 201. The functions discussed herein performed by such components are not generic computer functions. As a result, network switch 101 is a particular machine that is the result of implementing specific, non-generic computer functions.

In one embodiment, the functionality of such software components (e.g., lookup table creator engine 301 and packet analyzer 302) of network switch 101, including the functionality for minimizing the deviation from the average lookup latency of the hash table, may be embodied in an application specific integrated circuit.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
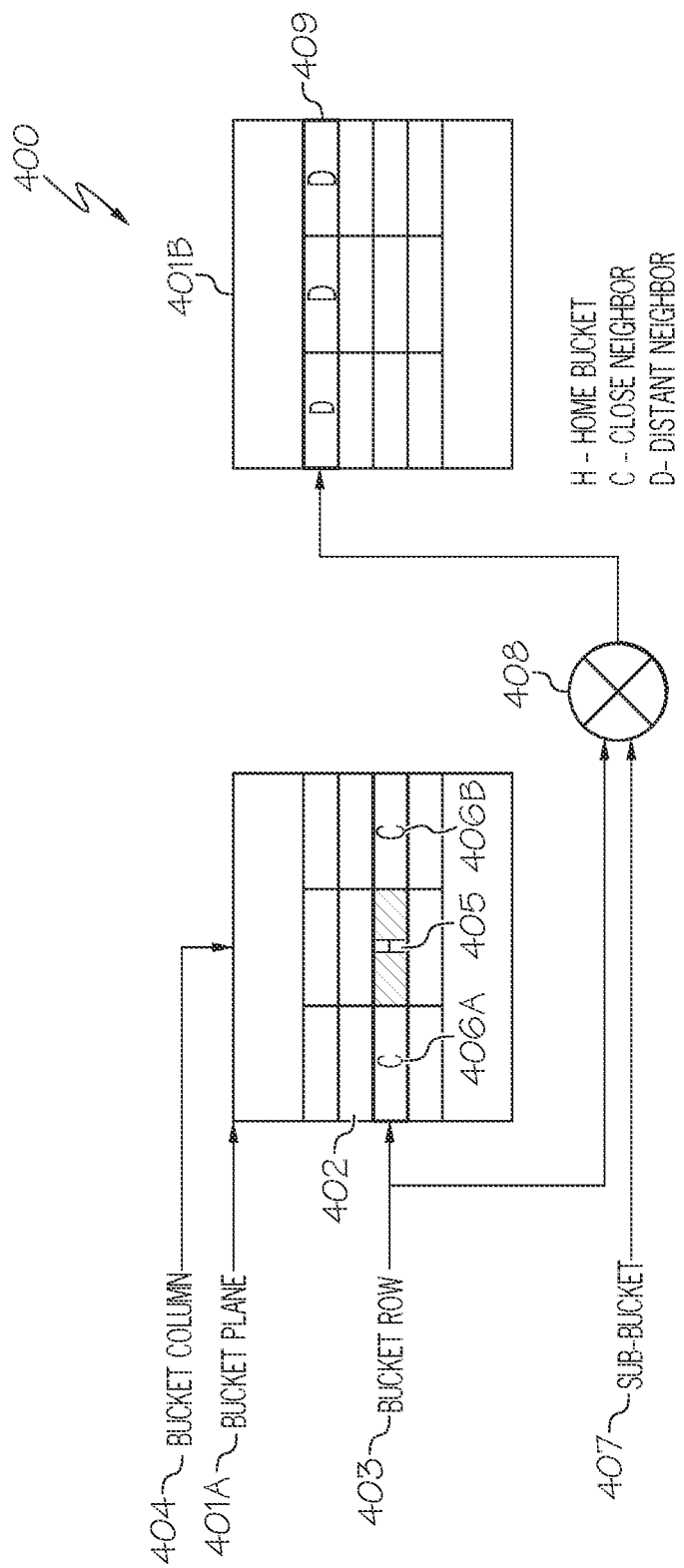
FIG. 4 illustrates an embodiment of a hash memory space in accordance with an embodiment of the present disclosure.
Figure 5:
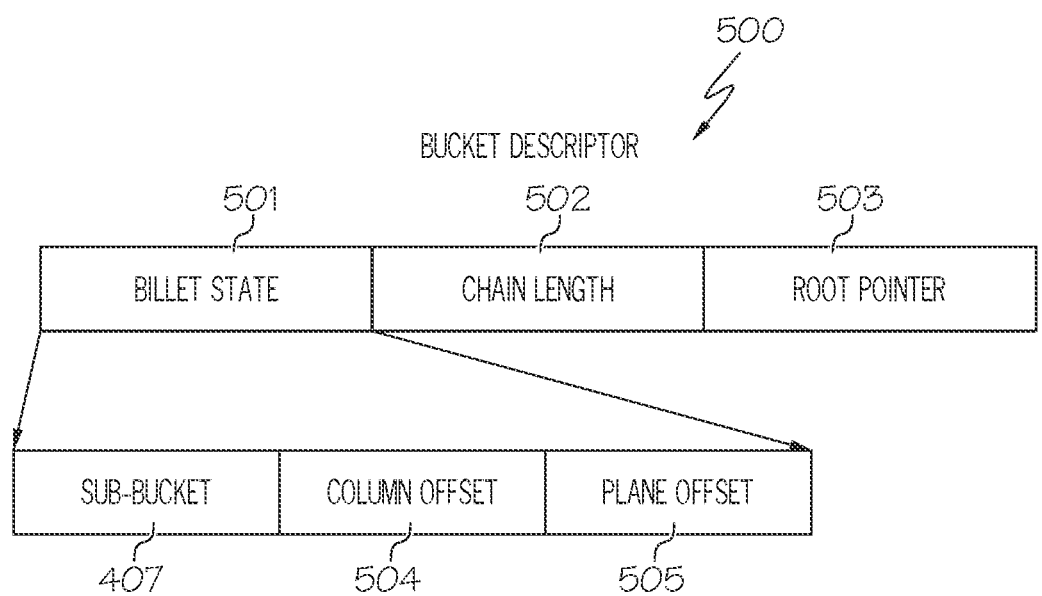
FIG. 5 illustrates an embodiment of the descriptor of the hash root buckets in accordance with an embodiment of the present disclosure.
Figure 6:
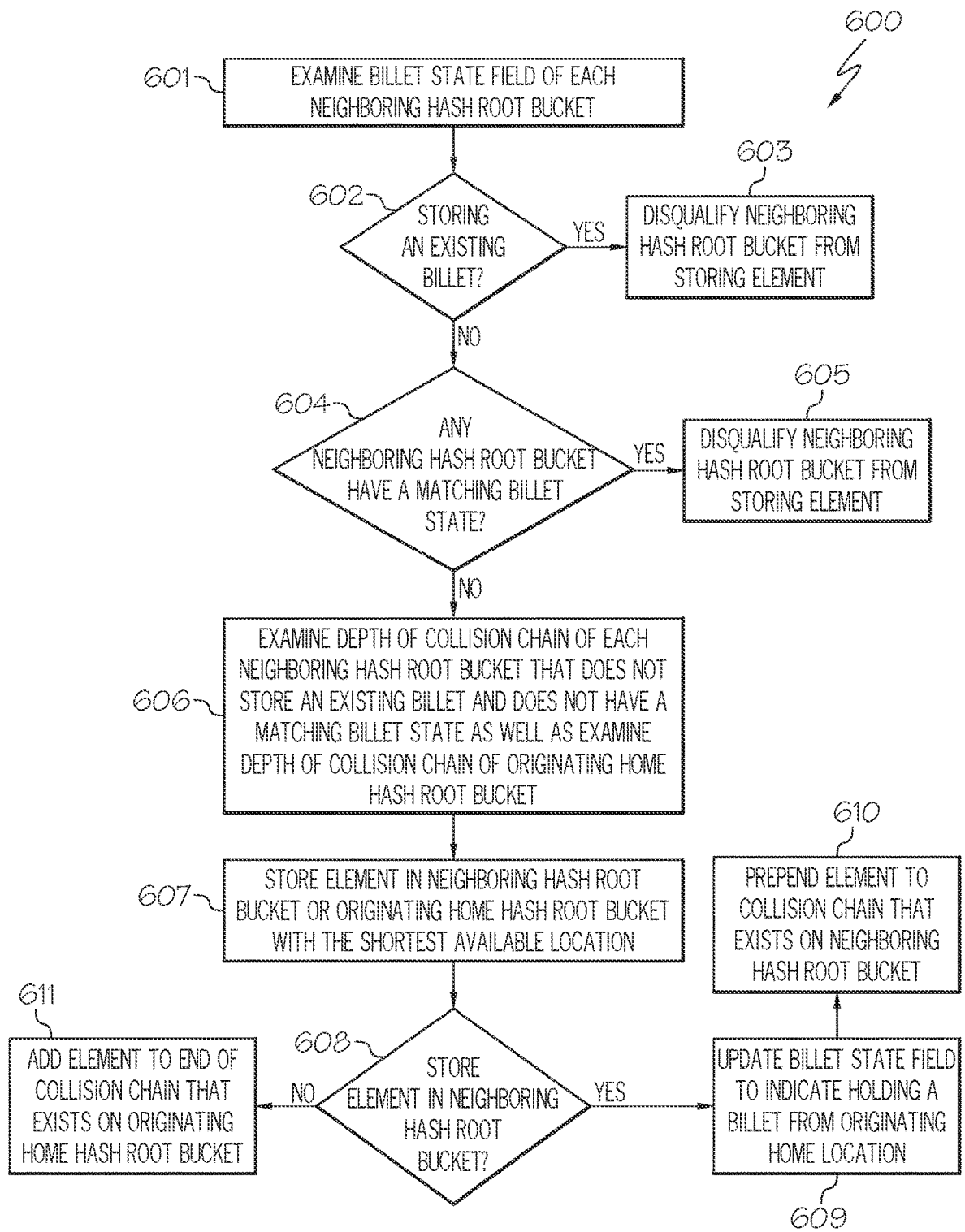
FIG. 6 is a flowchart of a method for populating a hash table in a manner that minimizes the deviation from the average lookup latency of the hash table in accordance with an embodiment of the present disclosure.
Figure 7:
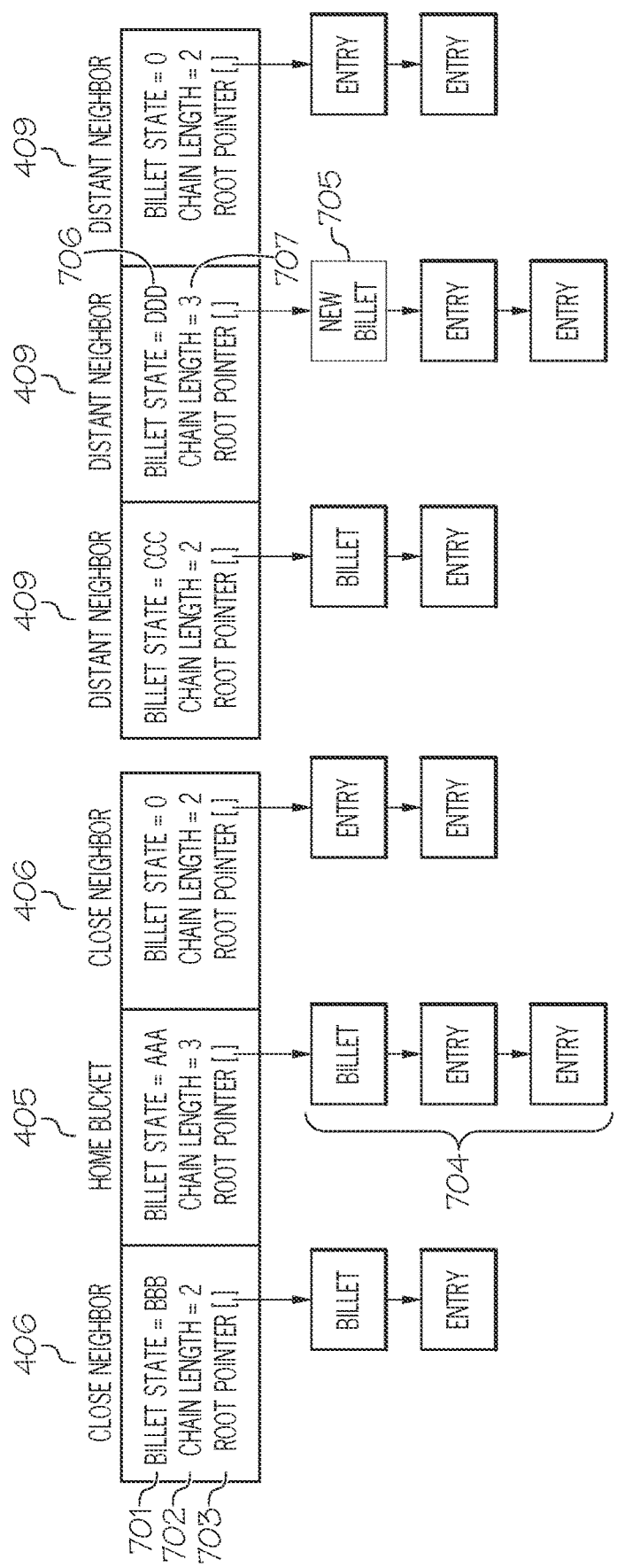
FIG. 7 illustrates prepending the element to the collision chain that exists on the neighboring hash root bucket in accordance with an embodiment of the present disclosure.
Figure 8:
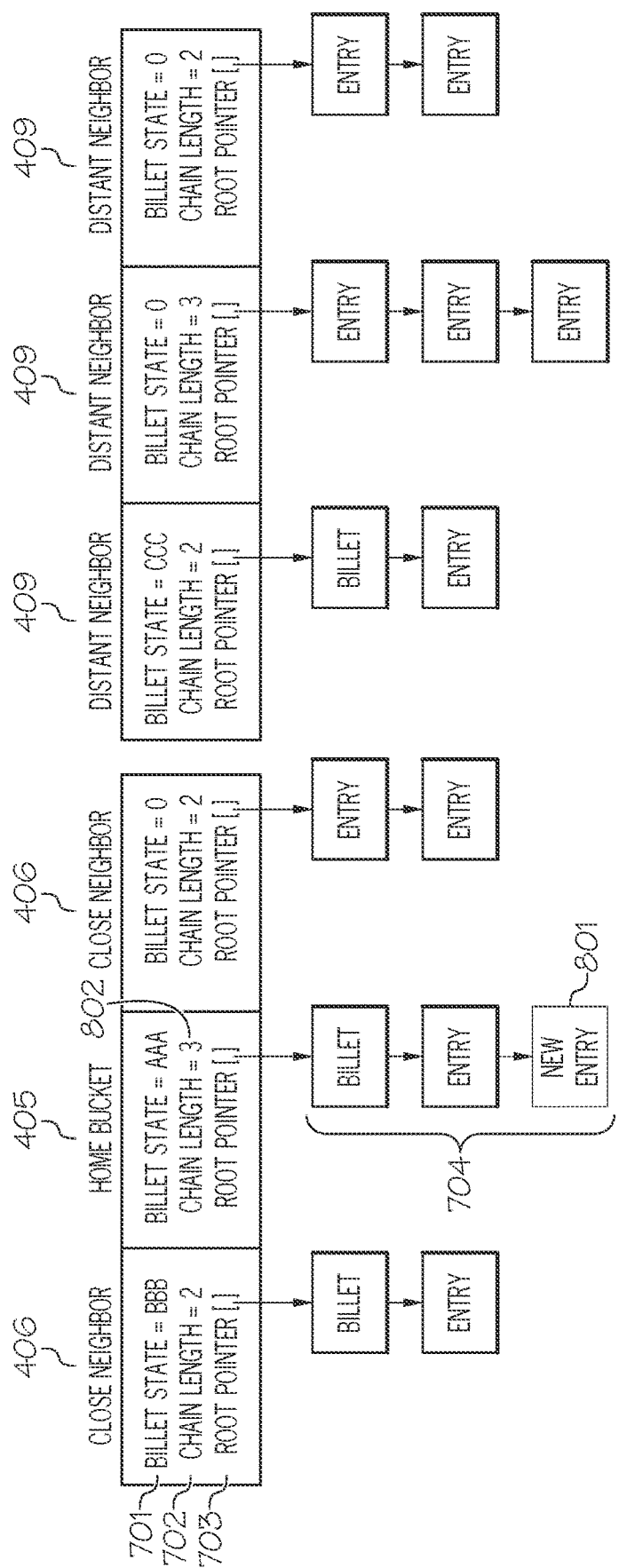
FIG. 8 illustrates adding an element at the end of the collision chain that exists on the home hash root bucket in accordance with an embodiment of the present disclosure.
Figure 9A:
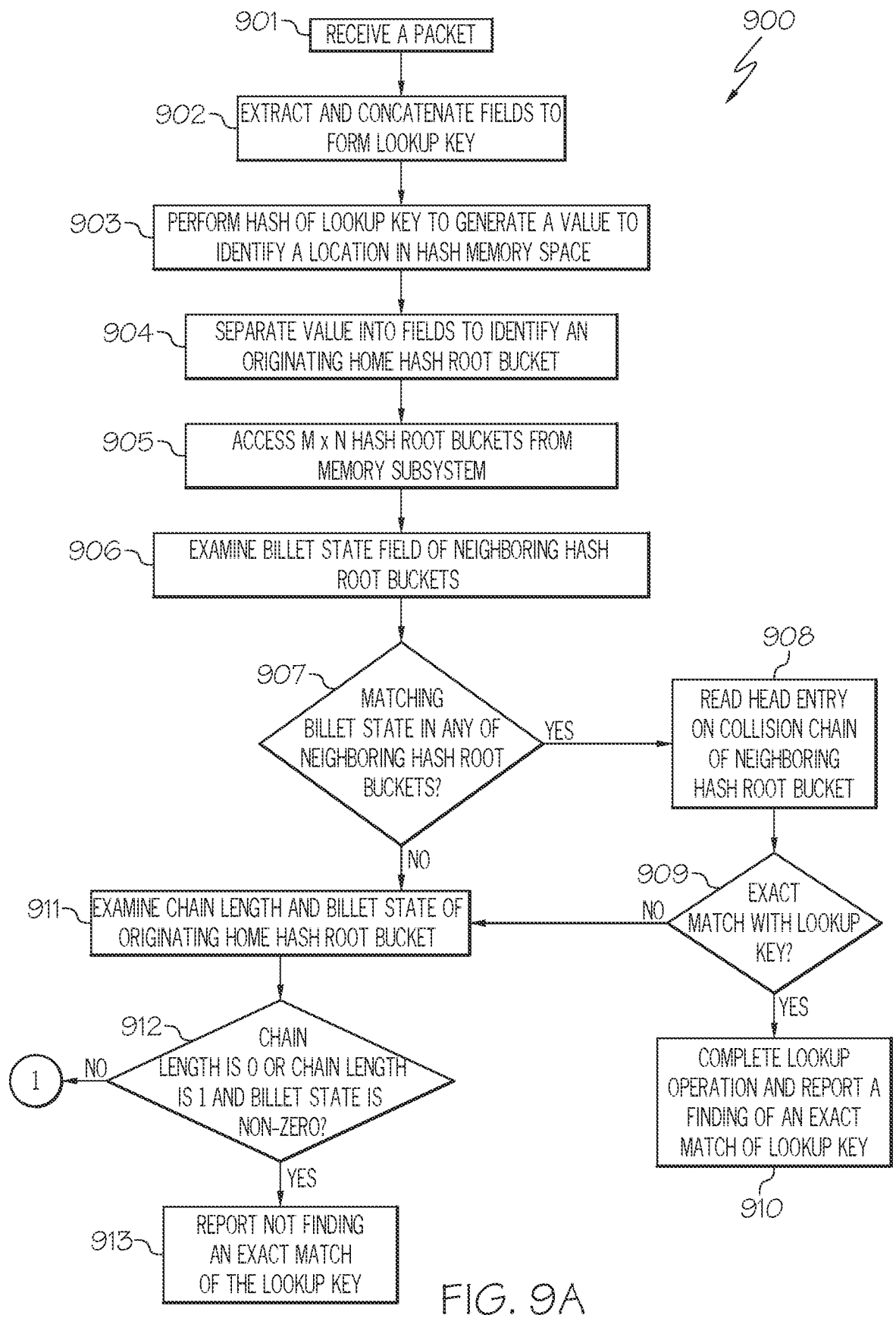
FIGS. 9A-9B are a flowchart of a method for performing an exact match lookup operation in a hash table in a manner that minimizes the deviation from the average lookup latency to ensure appropriate line rate performance in accordance with an embodiment of the present disclosure.
Figure 9B:
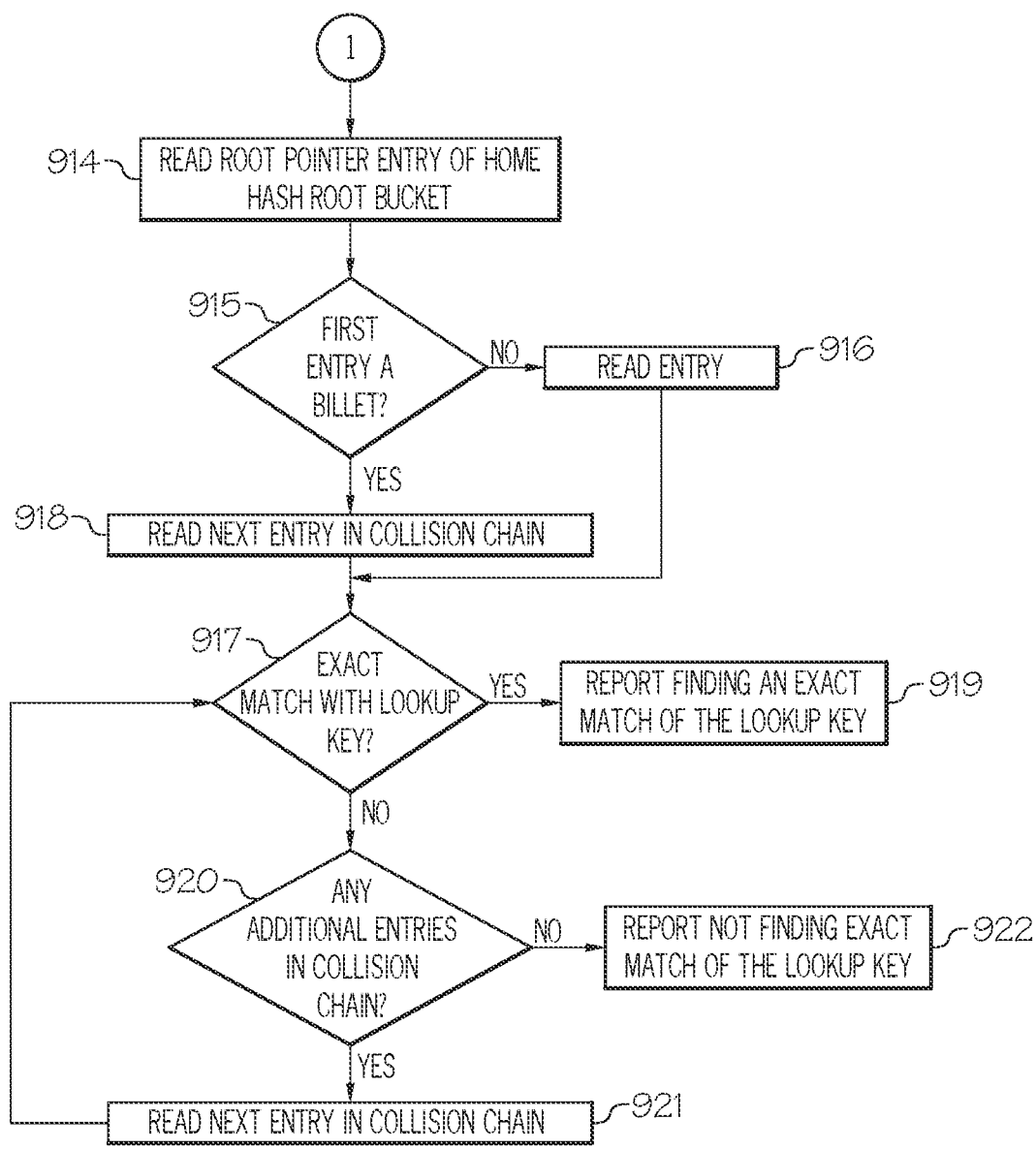

The embodiments of the present disclosure provide a means for effectively minimizing the deviation from the average lookup latency to ensure appropriate line rate performance by utilizing a concept referred to herein as "billeting," which as used herein, refers to a neighboring hash root bucket temporarily hosting or storing an element (data) of an originating home hash bucket as discussed further below in connection with FIGS. 4-8 and 9A-9B. FIG. 4 illustrates an embodiment of a hash memory space. FIG. 5 illustrates an embodiment of the descriptor of the hash root buckets. FIG. 6 is a flowchart of a method for populating a hash table in a manner that minimizes the deviation from the average lookup latency of the hash table. FIG. 7 illustrates prepending the element to the collision chain that exists on the neighboring hash root bucket. FIG. 8 illustrates adding an element at the end of the collision chain that exists on the home hash root bucket. FIGS. 9A-9B are a flowchart of a method for performing an exact match lookup operation in a hash table in a manner that minimizes the deviation from the average lookup latency to ensure appropriate line rate performance.

As stated above, FIG. 4 illustrates an embodiment of a hash memory space 400 in accordance with an embodiment of the present disclosure.

Referring to FIG. 4, in conjunction with FIGS. 1-3, hash memory space 400, the memory location of the hash table, may be part of memory 202 (FIG. 2), such as part of standard RAM, or part of lookup table 205 of forwarding engine 204. In one embodiment, hash memory space 400 is organized into M independently addressable planes or banks 401A-401B, where the row of each memory plane contains N hash root buckets 402. Planes 401A-401B may collectively or individually be referred to as planes 401 or plane 401, respectively. A "plane" or "bank," as used herein, refers to a logical storage within computer memory that is used for storing and retrieving data. In one embodiment, "hash root buckets" (also referred to as "hash buckets" or simply "buckets"), as used herein, refer to the slots in the hash table. As discussed above, a hash table is a data structure that implements an associative array abstract data type, a structure that can map "keys" to values. Furthermore, such "keys" may be formed from network identifiers. A hash table uses a hash function to compute an index, also called a hash code, into an array of buckets or slots, from which the desired value can be found.

In one embodiment, the key or lookup key is hashed by a hash function to generate a value ("hash value") to identify a location in the table. In one embodiment, the created hash value is separated into multiple fields, such as a bucket row, a bucket column, a bucket plane and a sub-bucket. The bucket row, bucket column and bucket plane are used to identify a home hash root bucket within hash memory space 400 as well as inherently provide N−1 adjacent neighboring hash root buckets within the same row.

In one embodiment, the sub-bucket is a secondary hash value that is used to return M memory rows on alternative memory planes to the home memory plane thereby providing (M−1)×N neighboring buckets. In one embodiment, the sub-bucket is hashed differently for each alternative memory plane 401 allowing for a random distribution of alternate rows on each plane 401 depending on the sub-bucket.

Referring again to FIG. 4, FIG. 4 illustrates an example of a hash memory space 400 being organized into two planes 401A-401B, where the row 403 ("bucket row") of each plane 401 contains three hash root buckets 402, one for each of the three columns 404 ("bucket column"). In one embodiment, the home hash root bucket is identified by the row, column and plane of plane 402A. For example, the home hash root bucket 405 is identified by the row, column and plane of plane 402A, which are obtained from the created hash value. The two hash root buckets on the sides of home hash root bucket 405 correspond to the "close neighbors" 406A-406B. A "close neighbor," as used herein, refers to those hash root buckets in the same row as the home hash root bucket. Close neighbors 406A-406B may collectively or individually be referred to as close neighbors 406 or close neighbor 406.

Furthermore, as shown in FIG. 4, the sub-bucket portion of the hash (see element 407) is used to transform the row in the independently addressable alternative memory plane 402B, such as via a multiplier 408, which multiplies sub-bucket 407 with bucket row 403 containing the home hash root bucket 405 in question. For example, as shown in FIG. 4, sub-bucket 407 is used to identify three "distant neighbors" 409 of home hash root bucket 405 in plane 401B. A "distant neighbor," as used herein, refers to those hash root buckets that were identified based on sub-bucket 407 in an alternative plane 401, such as plane 401B.

A description of the descriptor of the hash root buckets 402 is provided below in connection with FIG. 5.

FIG. 5 illustrates an embodiment of descriptor 500 of hash root buckets 402 in accordance with an embodiment of the present disclosure.

Referring to FIG. 5, in conjunction with FIG. 4, in one embodiment, descriptor 500 of hash root buckets 402 includes a "billet" state field 501, a chain length field 502 and a root pointer field 503. The term "billeting," as used herein, refers to a neighboring hash root bucket temporarily hosting or storing an element (data) of an originating home hash root bucket (also simply referred to herein as simply the "home hash root bucket" or "home hash bucket"). The term "billet," as used herein, refers to the element of data of an originating home hash root bucket (e.g., home hash root bucket 405) temporarily hosted or stored in a chain (e.g., collision chain). When such a situation occurs, the "billet" state field 501 includes sub-bucket 407, a column offset 504 and a plane offset 505 that identifies the location of a neighboring hash root bucket with respect to the originating home hash root bucket. For example, referring to FIG. 4, billet state field 501 may identify the location of a neighboring hash root bucket in plane 401B with respect to the originating home hash root bucket 405 that is used to temporarily host or store an element of originating home hash root bucket 405.

Chain length field 502 stores the collision chain (also referred to herein as simply "chain") of a certain depth. The "collision chain," as used herein, refers to a linked list of elements that have the same hash function value. In one embodiment, such a field 502, is used to handle collisions via "separate chaining." "Separate chaining," as used herein, refers to a scheme in which each position in the hash table has a list to handle collisions. Each position may be a link to the list or may be an item and a link, essentially, the head of a list.

The root pointer field 503, as used herein, stores a pointer that points to the first element in a linked list, such as the list of elements stored in a collision chain.

A further discussion regarding descriptor 500 of hash root buckets 402 is provided below in connection with the method for populating a hash table, such as the table formed in hash memory space 400, as discussed in FIG. 6.

FIG. 6 is a flowchart of a method 600 for populating a hash table, such as the table formed in hash memory space 400 (FIG. 4), in a manner that minimizes the deviation from the average lookup latency of the hash table in accordance with an embodiment of the present disclosure. In particular, in one embodiment, method 600 determines which of the available M×N hash root buckets in memory space 400 is the best choice to insert or store an element.

Referring to FIG. 6, in conjunction with FIGS. 1-5, in step 601, lookup table creator engine 301 of network switch 101 examines billet state field 501 of each of the neighboring hash root bucket locations. As previously discussed, billet state field 501 is used to identify the location of a neighboring hash root bucket in plane 401 with respect to the originating home hash root bucket (e.g., originating home hash root bucket 405) that is used to temporarily host or store an element of the originating home hash root bucket.

For example, a home hash root bucket may be identified based on hashing a lookup key (e.g., concatenation of the fields of a packet received by network switch 101) by a hashing algorithm (e.g., cyclic redundancy check, XOR, summing tuple, modular hashing, etc.) to produce a hashing value. The hashing value may be separated into multiple fields, such as a bucket row 403, a bucket column 404, a bucket plane 401 and a sub-bucket 407 as previously discussed. Neighbor hash root bucket locations may then be determined based on identifying those hash root buckets 406 ("close neighbors" 406) located in the same row as the home hash root bucket (e.g., home hash root bucket 405) as well identifying those located in alternative planes 401 ("distant neighbors" 409) using sub-bucket 407 as discussed above.

As also discussed above, method 600 determines which of the available M×N hash root buckets in memory space 400 is the best choice to insert or store an element. As a result, each of the (M×N)−1 neighbor hash bucket locations has the possibility of hosting this insertion as a "billet." As previously discussed, such a "billet" refers to the element of data of an originating home hash root bucket (e.g., home hash root bucket 405) temporarily hosted or stored in a chain (e.g., collision chain). By incorporating the concept of storing a billet, the deviation from the average lookup latency is minimized by providing randomness to the alternative secondary hash locations allowing more opportunities for hash chaining to be avoided thereby reducing the average probe depth to find a hash hit or miss.

As a result, billet state field 501 is examined in each of the neighboring hash root buckets (e.g., hash root buckets 406, 409) to determine if a neighboring hash root bucket is already temporarily hosting or storing an element of an originating home hash root bucket.

For each of the examined neighboring hash root buckets, in step 602, lookup table creator engine 301 of network switch 101 determines whether the neighboring hash root bucket (e.g., hash root bucket 406, 409) in question stores a billet. That is, lookup table creator engine 301 determines whether billet state field 501 in the neighboring hash root bucket (e.g., hash root bucket 406, 409) in question is already hosting or storing a billet corresponding to an element of the originating home hash root bucket (e.g., home hash root bucket 405).

If the neighboring hash root bucket (e.g., hash root bucket 406, 409) is storing an existing billet, then, in step 603, lookup table creator engine 301 of network switch 101 disqualifies the neighboring hash root bucket (e.g., hash root bucket 406, 409) from storing the element.

If, however, the neighboring hash root bucket (e.g., hash root bucket 406, 409) does not store an existing billet, then, in step 604, lookup table creator engine 301 of network switch 101 determines whether any of the neighboring hash root buckets (e.g., hash root bucket 406, 409) have a matching billet state. A "matching" billet state, as used herein, refers to billet state field 501 containing the values of sub-bucket 407, column offset 504 and plane offset 505 that identifies the neighboring hash root bucket in question as storing the element of the home hash root bucket in question (e.g., home hash root bucket 405).

If a neighboring hash root bucket (e.g., hash root bucket 406, 409) has a matching billet state, then, in step 605, lookup table creator engine 301 of network switch 101 disqualifies the neighboring hash root bucket (e.g., hash root bucket 406, 409) from storing the element.

If, however, the neighboring hash root bucket (e.g., hash root bucket 406, 409) does not have a matching billet state, then, in step 606, lookup table creator engine 301 of network switch 101 examines the depth of the collision chain of each neighboring hash root bucket (e.g., hash root bucket 406, 409) that does not store an existing billet and does not have a matching billet state as well as examines the depth of the collision chain of the originating home hash root bucket (e.g., originating home hash root bucket 405). The "originating home hash root bucket," as used herein, refers to the home hash root bucket (e.g., home hash root bucket 405) that is identified based on the hash value generated from performing a hash of the lookup key. The "collision chain depth," as used herein, refers to the length of the linked list of elements that have the same hash function value as stored in chain length field 502 of the respective hash root bucket. In one embodiment, method 600 will choose to insert or store the element into the shortest available location. That is, method 600 will insert or store the element into the chain (collision chain) with the shortest length as defined in chain length field 502.

In step 607, lookup table creator engine 301 of network switch 101 stores the element in the neighboring hash root bucket (e.g., neighbor hash root bucket 406, 409) or in the originating home hash root bucket (e.g., home hash root bucket 405) with the shortest available location. That is, lookup table creator engine 301 of network switch 101 stores the element in the neighboring hash root bucket (e.g., neighbor hash root bucket 406, 409) or in the originating home hash root bucket (e.g., home hash root bucket 405) with the shortest depth (shortest length) of its collision chain as discussed further below.

In step 608, a determination is made by lookup table creator engine 301 of network switch 101 as to whether the element is to be stored in a neighboring hash root bucket (e.g., neighboring hash root bucket 406, 409).

If the element is to be stored in a neighboring hash root bucket (e.g., neighboring hash root bucket 406, 409) because the neighboring hash root bucket has a collision chain with the shortest length, then, in step 609, lookup table creator engine 301 of network switch 101 updates billet state field 501 to indicate that the respective neighboring hash root bucket (e.g., neighboring hash root bucket 406, 409) is holding a billet from the originating home location (i.e., from the originating home hash root bucket). That is, in step 609, lookup table creator engine 301 updates billet state field 501 to indicate temporarily storing the element from the originating home hash root bucket.

In step 610, lookup table creator engine 301 of network switch 101 prepends the element to the chain (collision chain) that exists on the neighboring hash root bucket (e.g., neighboring hash root bucket 406, 409) as shown in FIG. 7.

FIG. 7 illustrates prepending the element to the collision chain that exists on the neighboring hash root bucket in accordance with an embodiment of the present disclosure.

Referring to FIG. 7, in conjunction with FIGS. 4-5, FIG. 7 illustrates billet state 701 as stored in billet state field 501 for both the originating home hash root bucket 405 ("home bucket") as well as the close neighbors 406 and distant neighbors 409. Furthermore, FIG. 7 illustrates the chain length 702 as stored in chain length field 502, which indicates the depth of the collision chain or the length of the linked list of elements that have the same hash function value. Additionally, FIG. 7 illustrates the root pointer 703 as stored in root pointer field 503, which includes a pointer that points to the first element in the linked list, such as the list of elements stored in a collision chain 704.

In the situation where the neighboring hash root bucket has a collision chain with the shortest length, lookup table creator engine 301 prepends the element 705 to the chain that exists on the neighboring hash root bucket (e.g., neighboring hash root bucket 406, 409) as the new billet as shown in FIG. 7. Billet state 701 is updated, such as shown in element 706 (e.g., "ddd"), to indicate that the neighboring hash root bucket is holding a billet from the originating home location. Also, in one embodiment, chain length 702 is updated, such as shown in element 707 (e.g., "3"), to reflect an increase in the depth of the collision chain (i.e., the length of the linked list of elements).

Returning to step 608 of FIG. 6, if, however, the element is to be stored in the originating home hash root bucket (e.g., home hash root bucket 405) because the originating home hash root bucket has a collision chain with the shortest length, then, in step 611, lookup table creator engine 301 of network switch 101 adds the element to the end of the collision chain that exists on the originating home hash root bucket (e.g., home hash root bucket 405) as illustrated in FIG. 8.

FIG. 8 illustrates adding an element at the end of the collision chain that exists on the home hash root bucket in accordance with an embodiment of the present disclosure.

Referring to FIG. 8, in conjunction with FIGS. 5 and 7, in the situation where the originating home hash root bucket (e.g., home hash root bucket 405) has a collision chain with the shortest length, lookup table creator engine 301 adds the element 801 to the collision chain that exists on the originating home hash root bucket as shown in FIG. 8. Also, in one embodiment, chain length 702 is updated, such as shown in element 802 (e.g., "3"), to reflect an increase in the depth of the collision chain (i.e., the length of the linked list of elements).

Upon populating the hash table, such as the table formed in hash memory space 400 (FIG. 4), in a manner that minimizes the deviation from the average lookup latency of the hash table, an exact match lookup operation is performed in such a hash table in a manner that minimizes the deviation from the average lookup latency to ensure appropriate line rate performance as discussed below in connection with FIGS. 9A-9B.

FIGS. 9A-9B are a flowchart of a method 900 for performing an exact match lookup operation in a hash table in a manner that minimizes the deviation from the average lookup latency to ensure appropriate line rate performance in accordance with an embodiment of the present disclosure.

Referring to FIG. 9A, in conjunction with FIGS. 1-8, in step 901, packet analyzer 302 of network switch 101 receives a packet, such as a packet of network traffic received over network 102.

In step 902, packet analyzer 302 of network switch 101 extracts and concatenates the fields of the packet to form a lookup key. For example, in one embodiment, packet analyzer 302 extracts and concatenates the source port and destination port fields from the packet to form a lookup key. In one embodiment, the length field of the packet, which specifies the length of the header and data, may also be extracted and concatenated to form the lookup key.

In step 903, packet analyzer 302 of network switch 101 performs a hash of the lookup key to generate a value which is used to identify a location in hash memory space 400 organized into M independently addressable planes 401, where each row of plane 401 contains N hash root buckets 402. For example, a value ("hash value") may be generated based on hashing the lookup key by a hashing algorithm (e.g., cyclic redundancy check, XOR, summing tuple, modular hashing, etc.). By performing such a hash, an originating home hash root bucket 405 may be identified.

In step 904, packet analyzer 302 of network switch 101 separates the value into fields including a bucket row 403, a bucket column 404, a bucket plane 401 and a sub-bucket 407 (secondary hash value), where bucket row 403, bucket column 404 and bucket plane 401 are used to identify an originating home hash bucket 405.

In step 905, packet analyzer 302 of network switch 101 accesses M×N hash root buckets 402, such as the neighboring hash root buckets 406, 409, from the memory subsystem. The "memory subsystem," as used herein, refers to the hardware and software components that include the primary storage area of network switch 101 (e.g., memory 202), where the programs and the data they use are stored while the programs are executing. Examples of such a memory subsystem include both hardware and software components, such as processor 201 and memory 202. In one embodiment, the memory subsystem is able to provide such information to packet analyzer 302 based on hash memory space 400 being part of memory 202 or part of lookup table 205 of forwarding engine 204.

As previously discussed, neighboring hash root bucket locations may be determined based on identifying those hash root buckets 402 (e.g., "close neighbors" 406) located in the same row as the home hash root bucket 405 as well identifying those hash root buckets 402 located in alternative planes 401 ("distant neighbors" 409) using sub-bucket 407 as discussed above.

In step 906, packet analyzer 302 of network switch 101 examines the billet state field 501 of neighboring hash root buckets (e.g., neighboring hash root buckets 406, 409).

As previously discussed, billet state field 501 is used to identify the location of a neighboring hash root bucket in plane 401 with respect to the originating hash root bucket (e.g., home hash root bucket 405) that is used to temporarily host or store an element of the originating hash root bucket.

As a result, billet state field 501 is examined in each of the neighboring hash root buckets (e.g., hash root bucket 406, 409) to determine if a neighboring hash root bucket is already temporarily hosting or storing an element of an originating home hash root bucket 405.

In step 907, packet analyzer 302 of network switch 101 determines whether any of the neighboring hash root buckets (e.g., hash root bucket 406, 409) has a matching billet state. A "matching" billet state, as used herein, refers to billet state field 501 containing the values of sub-bucket 407, column offset 504 and plane offset 505 that identifies the neighboring hash root bucket in question as storing the element of the originating home hash root bucket in question (e.g., home hash root bucket 405).

If the neighboring hash root bucket (e.g., hash root bucket 406, 409) has a matching billet state, then, in step 908, packet analyzer 302 of network switch 101 reads the head entry on the collision chain of the neighboring hash root bucket (e.g., neighboring hash root bucket 406, 409), such as reading head entry 705 of the collision chain. It is noted that only the head entry needs to be read from memory and checked for a full match with the lookup key since the billet is stored as the head entry on a chain in a neighboring hash root bucket as previously discussed.

In step 909, a determination is made by packet analyzer 302 of network switch 101 as to whether there is an exact match with the lookup key. That is, a determination is made by packet analyzer 302 as to whether the value of the head entry is an exact match with the lookup key.

If there is an exact match with the lookup key, then, in step 910, packet analyzer 302 of network switch 101 completes the lookup operation and reports a finding of an exact match of the lookup key. In one embodiment, network switch 101 transmits the received network packet to the appropriate device using the value in the hash table associated with the matched lookup key, such as the destination address.

Returning to steps 907 and 909, if, however, the neighboring hash root bucket (e.g., neighboring hash root bucket 406, 409) does not have a matching billet state, or if, however, there is not an exact match with the lookup key, then, in step 911, packet analyzer 302 of network switch 101 examines chain length 702 and billet state 701 of the originating home hash root bucket 405.

In step 912, packet analyzer 302 of network switch 101 determines whether chain length 702 is 0 (implying that there are no elements stored in the collision chain) or whether chain length 702 is 1 and billet state 701 is non-zero (implying that there is only one entry in the collision chain and it is a billet).

If chain length 702 is 0 or chain length 702 is 1 and billet state 701 is non-zero, then, in step 913, packet analyzer 302 of network switch 101 reports not finding an exact match of the lookup key. That is, packet analyzer 302 reports a finding that no exact match entries were identified.

Referring now to FIG. 9B, in conjunction with FIGS. 1-8, if however, chain length 702 is not 0 and is not 1 along with billet state 702 being non-zero, then, in step 914, packet analyzer 302 of network switch 101 reads the root pointer entry in collision chain 704 of the originating home hash root bucket 405. The "root pointer entry," as used herein, refers to the first entry in collision chain 704 pointed to by root pointer 703.

In step 915, packet analyzer 302 of network switch 101 determines if the first entry in collision chain 704 pointed to by root pointer 703 corresponds to a billet.

If the entry pointed to by root pointer 703 does not correspond to a billet, then, in step 916, packet analyzer 302 of network switch 101 reads the entry followed by determining in step 917 as to whether there is an exact match with the lookup key. That is, a determination is made by packet analyzer 302 in step 917 as to whether the value of the entry read in step 916 is an exact match with the lookup key.

If, however, the entry pointed to by root pointer 703 corresponds to a billet, then, in step 918, packet analyzer 302 of network switch 101 reads the next entry in collision chain 704 followed by determining in step 917 as to whether there is an exact match with the lookup key. That is, a determination is made by packet analyzer 302 in step 917 as to whether the value of the entry read in step 918 is an exact match with the lookup key.

If there is an exact match with the lookup key, then, in step 919, packet analyzer 302 of network switch 101 completes the lookup operation and reports a finding of an exact match of the lookup key. In one embodiment, network switch 101 transmits the received network packet to the appropriate device using the value in the hash table associated with the matched lookup key, such as the destination address.

If, however, there is not an exact match with the lookup key, then, in step 920, packet analyzer 302 of network switch 101 determines whether there are any additional entries in collision chain 704.

If there are additional entries in collision chain 704, then, in step 921, packet analyzer 302 of network switch 101 reads the next entry in collision chain 704 followed by determining in step 917 as to whether there is an exact match with the lookup key. That is, a determination is made by packet analyzer 302 in step 917 as to whether the value of the entry read is an exact match with the lookup key.

If, however, there are no additional entries in collision chain 704, then, in step 922, packet analyzer 302 of network switch 101 reports not finding an exact match of the lookup key. That is, packet analyzer 302 reports a finding that no exact match entries were identified.

In this manner, the deviation from the average lookup latency is minimized to ensure appropriate line rate performance. In one embodiment, the deviation from the average lookup latency is minimized by providing randomness to the alternative secondary hash locations allowing more opportunities for hash chaining to be avoided thereby reducing the average probe depth to find a hash hit or miss. That is, billeting reduces the likelihood of having to create hash chaining, which in turn, reduces the overall latency of the lookup.

Furthermore, the principles of the present disclosure improve the technology or technical field involving networking equipment.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for performing exact match lookup operations in a table comprises receiving a packet. The method further comprises extracting and concatenating fields in the packet to form a lookup key. The method additionally comprises performing a hash of the lookup key to generate a value which is used to identify a location in the table. Furthermore, the method comprises separating the value into fields comprising a bucket row, a bucket column, a bucket plane and a secondary hash value, where the bucket row, the bucket column and the bucket plane are used to identify an originating home hash root bucket. Additionally, the method comprises reading a head entry on a collision chain of one of one or more neighboring hash root buckets to determine if an exact match of the lookup key exists in response to a state field of the one of the one or more neighboring hash root buckets comprising the secondary hash value, a column offset to a column location of the originating home hash root bucket and a plane offset to a plane location of the originating home hash root bucket. In addition, the method comprises reporting a finding of an exact match of the lookup key in response to the head entry on the collision chain of the one of the one or more neighboring hash root buckets exactly matching the lookup key.

Additionally, in one embodiment of the present disclosure, the method further comprises that a descriptor of each of the one or more neighboring hash root buckets comprises the following fields: the state field, a chain length field and a root pointer field.

Furthermore, in one embodiment of the present disclosure, the method additionally comprises that a descriptor of each of the one or more neighboring hash root buckets comprises the state field, where the state field of a neighboring hash root bucket is used to indicate whether the neighboring hash root bucket temporarily stores an element of the originating home hash root bucket.

Additionally, in one embodiment of the present disclosure, the method further comprises examining a chain length field and a state field of the originating home hash root bucket in response to the head entry on the collision chain of the one of the one or more neighboring hash root buckets not exactly matching the lookup key.

Furthermore, in one embodiment of the present disclosure, the method additionally comprises examining a chain length in the chain length field and a value of the state field of the originating home hash root bucket.

Additionally, in one embodiment of the present disclosure, the method further comprises reporting not finding the exact match of the lookup key in response to a value of the chain length field indicating a chain length of zero or in response to a value of the chain length field indicating a chain length of one and a value in the state field of the originating home hash root bucket being nonzero.

Furthermore, in one embodiment of the present disclosure, the method additionally comprises reading a root pointer entry in a collision chain of the originating home hash root bucket in response to a value of the chain length field not indicating the chain length of zero and in response to the value of the chain length field not indicating the chain length of one and the value in the state field of the originating home hash root bucket not being nonzero. The method further comprises reporting the finding of the exact match of the lookup key in response to the root pointer entry exactly matching the lookup key.

Additionally, in one embodiment of the present disclosure, the method further comprises reading a next entry to the root pointer entry in the collision chain of the originating home hash root bucket in response to the root pointer entry not exactly matching the lookup key or in response to the root pointer entry temporarily storing an element for a second originating home hash root bucket.

Other forms of the embodiments of the method described above are in a network switch and in a computer program product.

In one embodiment of the present disclosure, a computer-implemented method for populating a table to perform exact match lookup operations comprises examining a state field of each of a plurality of neighboring hash root buckets stored in a hash memory space, where one or more of the plurality of neighboring hash root buckets are located in a same row as an originating home hash root bucket in the hash memory space, where the state field of each of the plurality of neighboring hash root buckets indicates whether a collision chain of a corresponding neighboring hash root bucket is used to temporarily store an element of the originating home hash root bucket, and where the originating home hash root bucket corresponds to a hash root bucket that is identified based on a hash value generated from performing a hash of a lookup key. The method further comprises examining a depth of the collision chain of each neighboring hash root bucket of the plurality of neighboring hash root buckets that does not have a value in the state field matching a value corresponding to a secondary hash value of the hash value, a column offset to a column location of the originating home hash root bucket and a plane offset to a plane location of the originating home hash root bucket. The method additionally comprises examining a depth of a collision chain of the originating home hash root bucket. Furthermore, the method comprises storing an element in one of the plurality of neighboring hash root buckets or in the originating home hash root bucket with the collision chain with a shortest length.

Additionally, in one embodiment of the present disclosure, the method further comprises updating a value in the state field of one of the plurality of neighboring hash root buckets storing the element to indicate temporarily storing the element from the originating home hash root bucket in response to storing the element in the one of the plurality of neighboring hash root buckets.

Furthermore, in one embodiment of the present disclosure, the method additionally comprises prepending the element to the collision chain of the one of the plurality of neighboring hash root buckets.

Additionally, in one embodiment of the present disclosure, the method further comprises adding the element to an end of the collision chain of the originating home hash root bucket in response to storing the element in the originating home hash root bucket.

Other forms of the embodiments of the method described above are in a network switch and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for performing exact match lookup operations in a table, the method comprising:
   receiving a packet;
   extracting and concatenating fields in said packet to form a lookup key;
   performing a hash of said lookup key to generate a value which is used to identify a location in said table;
   separating said value into fields comprising a bucket row, a bucket column, a bucket plane and a secondary hash value, wherein said bucket row, said bucket column and said bucket plane are used to identify an originating home hash root bucket;
   reading a head entry on a collision chain of one of one or more neighboring hash root buckets to determine if an exact match of said lookup key exists in response to a state field of said one of said one or more neighboring hash root buckets comprising said secondary hash value, a column offset to a column location of said originating home hash root bucket and a plane offset to a plane location of said originating home hash root bucket; and
   reporting a finding of an exact match of said lookup key in response to said head entry on said collision chain of said one of said one or more neighboring hash root buckets exactly matching said lookup key.

2. The method as recited in claim 1, wherein a descriptor of each of said one or more neighboring hash root buckets comprises the following fields: said state field, a chain length field and a root pointer field.

3. The method as recited claim 1, wherein a descriptor of each of said one or more neighboring hash root buckets comprises said state field, wherein said state field of a neighboring hash root bucket is used to indicate whether said neighboring hash root bucket temporarily stores an element of said originating home hash root bucket.

4. The method as recited in claim 1 further comprising:
examining a chain length field and a state field of said originating home hash root bucket in response to said head entry on said collision chain of said one of said one or more neighboring hash root buckets not exactly matching said lookup key.

5. The method as recited in claim 4 further comprising:
examining a chain length in said chain length field and a value of said state field of said originating home hash root bucket.

6. The method as recited in claim 5 further comprising:
reporting not finding said exact match of said lookup key in response to a value of said chain length field indicating a chain length of zero or in response to a value of said chain length field indicating a chain length of one and a value in said state field of said originating home hash root bucket being nonzero.

7. The method as recited in claim 5 further comprising:
reading a root pointer entry in a collision chain of said originating home hash root bucket in response to a value of said chain length field not indicating said chain length of zero and in response to said value of said chain length field not indicating said chain length of one and said value in said state field of said originating home hash root bucket not being nonzero; and
reporting said finding of said exact match of said lookup key in response to said root pointer entry exactly matching said lookup key.

8. The method as recited in claim 7 further comprising:
reading a next entry to said root pointer entry in said collision chain of said originating home hash root bucket in response to said root pointer entry not exactly matching said lookup key or in response to said root pointer entry temporarily storing an element for a second originating home hash root bucket.

9. A computer program product for performing exact match lookup operations in a table, the computer program product comprising one or more computer readable storage mediums having program code embodied therewith, the program code comprising programming instructions for:
receiving a packet;
extracting and concatenating fields in said packet to form a lookup key;
performing a hash of said lookup key to generate a value which is used to identify a location in said table;
separating said value into fields comprising a bucket row, a bucket column, a bucket plane and a secondary hash value, wherein said bucket row, said bucket column and said bucket plane are used to identify an originating home hash root bucket;
reading a head entry on a collision chain of one of one or more neighboring hash root buckets to determine if an exact match of said lookup key exists in response to a state field of said one of said one or more neighboring hash root buckets comprising said secondary hash value, a column offset to a column location of said originating home hash root bucket and a plane offset to a plane location of said originating home hash root bucket; and
reporting a finding of an exact match of said lookup key in response to said head entry on said collision chain of said one of said one or more neighboring hash root buckets exactly matching said lookup key.

10. The computer program product as recited in claim 9, wherein a descriptor of each of said one or more neighboring hash root buckets comprises the following fields: said state field, a chain length field and a root pointer field.

11. The computer program product as recited claim 10, wherein a descriptor of each of said one or more neighboring hash root buckets comprises said state field, wherein said state field of a neighboring hash root bucket is used to indicate whether said neighboring hash root bucket temporarily stores an element of said originating home hash root bucket.

12. The computer program product as recited in claim 9, wherein the program code further comprises the programming instructions for:
examining a chain length field and a state field of said originating home hash root bucket in response to said head entry on said collision chain of said one of said one or more neighboring hash root buckets not exactly matching said lookup key.

13. The computer program product as recited in claim 12, wherein the program code further comprises the programming instructions for:
examining a chain length in said chain length field and a value of said state field of said originating home hash root bucket.

14. The computer program product as recited in claim 13, wherein the program code further comprises the programming instructions for:
reporting not finding said exact match of said lookup key in response to a value of said chain length field indicating a chain length of zero or in response to a value of said chain length field indicating a chain length of one and a value in said state field of said originating home hash root bucket being nonzero.

15. The computer program product as recited in claim 13, wherein the program code further comprises the programming instructions for:
reading a root pointer entry in a collision chain of said originating home hash root bucket in response to a value of said chain length field not indicating said chain length of zero and in response to said value of said chain length field not indicating said chain length of one and said value in said state field of said originating home hash root bucket not being nonzero; and
reporting said finding of said exact match of said lookup key in response to said root pointer entry exactly matching said lookup key.

16. The computer program product as recited in claim 15, wherein the program code further comprises the programming instructions for:
reading a next entry to said root pointer entry in said collision chain of said originating home hash root bucket in response to said root pointer entry not exactly matching said lookup key or in response to said root pointer entry temporarily storing an element for a second originating home hash root bucket.

17. A computer-implemented method for populating a table to perform exact match lookup operations, the method comprising:
examining a state field of each of a plurality of neighboring hash root buckets stored in a hash memory space, wherein one or more of said plurality of neighboring hash root buckets are located in a same row as an originating home hash root bucket in said hash memory space, wherein said state field of each of said plurality of neighboring hash root buckets indicates whether a collision chain of a corresponding neighboring hash root bucket is used to temporarily store an element of said originating home hash root bucket, wherein said originating home hash root bucket corresponds to a hash root bucket that is identified based on a hash value generated from performing a hash of a lookup key;

examining a depth of said collision chain of each neighboring hash root bucket of said plurality of neighboring hash root buckets that does not have a value in said state field matching a value corresponding to a secondary hash value of said hash value, a column offset to a column location of said originating home hash root bucket and a plane offset to a plane location of said originating home hash root bucket;

examining a depth of a collision chain of said originating home hash root bucket; and storing an element in one of said plurality of neighboring hash root buckets or in said originating home hash root bucket with said collision chain with a shortest length.

18. The method as recited in claim 17 further comprising:
updating a value in said state field of one of said plurality of neighboring hash root buckets storing said element to indicate temporarily storing said element from said originating home hash root bucket in response to storing said element in said one of said plurality of neighboring hash root buckets.

19. The method as recited in claim 18 further comprising:
prepending said element to said collision chain of said one of said plurality of neighboring hash root buckets.

20. The method as recited in claim 17 further comprising:
adding said element to an end of said collision chain of said originating home hash root bucket in response to storing said element in said originating home hash root bucket.

* * * * *